N. J. CHARLSON.
POTATO PLANTER.
APPLICATION FILED JULY 16, 1909.

937,421.

Patented Oct. 19, 1909.

2 SHEETS—SHEET 1.

Witnesses

Inventor
Nels J. Charlson.

By C. A. Snow & Co.
Attorneys

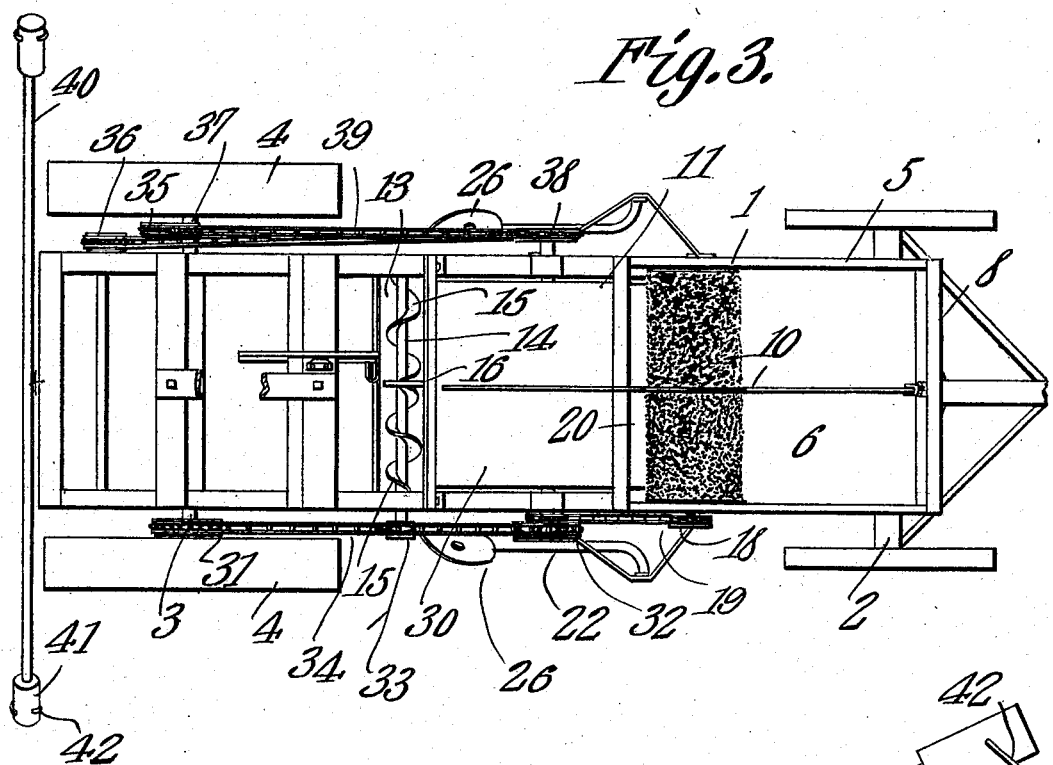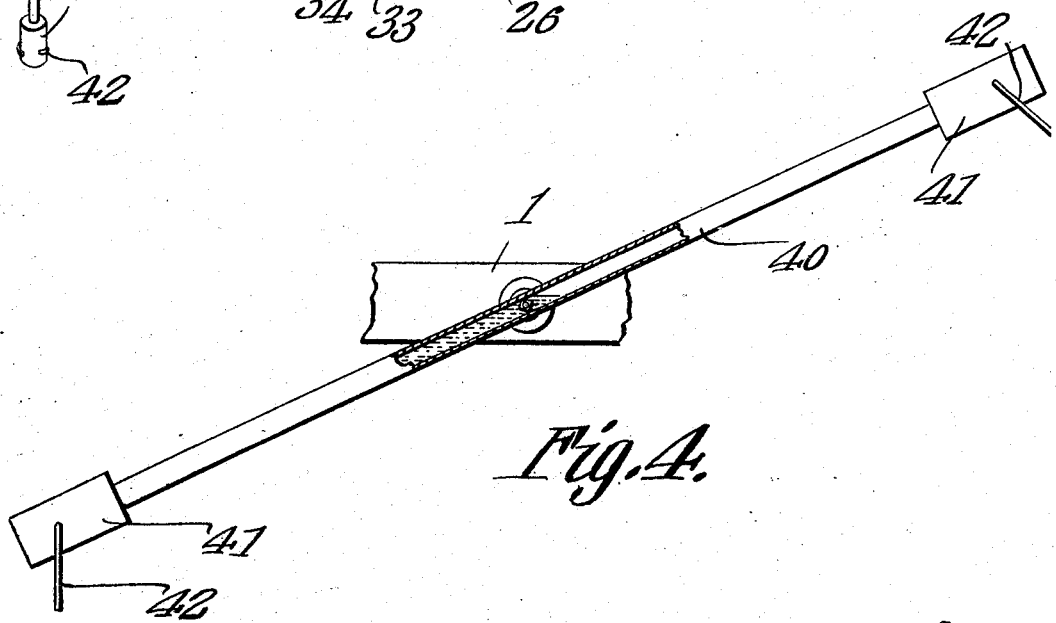

UNITED STATES PATENT OFFICE.

NELS JOSEPH CHARLSON, OF CHARLSON, NORTH DAKOTA.

POTATO-PLANTER.

937,421.  Specification of Letters Patent.  Patented Oct. 19, 1909.

Application filed July 16, 1909. Serial No. 507,975.

*To all whom it may concern:*

Be it known that I, NELS J. CHARLSON, a citizen of the United States, residing at Charlson, in the county of McKenzie and State of North Dakota, have invented a new and useful Potato-Planter, of which the following is a specification.

This invention has relation to potato planters, and it consists in the novel construction and arrangement of its parts, as hereinafter shown and described.

The object of the invention is to provide a planter of the character indicated which is adapted to deposit or plant two rows of potatoes simultaneously and in such alinement that the resultant plants may be easily cultivated as they arrive at maturity.

With the above object in view the planter comprises a wheel-mounted frame upon which is located a hopper having a flexible bottom. A rotating drum is located behind the hopper and forms one side of the same. The said drum is provided upon its periphery with a series of pockets, which are adapted to receive potatoes from the hopper and convey the same to a trough, in which is located a worm conveyer. The said worm conveyer is so disposed and mounted as to convey the potatoes deposited in the said trough toward the ends of the same where the potatoes are dropped behind furrow-openers and are then covered with soil by furrow-closers. After the potatoes are thus deposited in the soil, traction wheels, which constitute some of the supporting wheels of the implement, follow upon the earth cast back in the furrows, and presses the soil firmly against the potatoes planted. Means is provided in the hopper for preventing a surplus of potatoes from entering the pockets of the drum, and the implement is provided with a marker adapted to indicate a line in the soil as one set of rows are planted for indicating the course of the machine upon its return and planting another set of rows.

Figure 1:
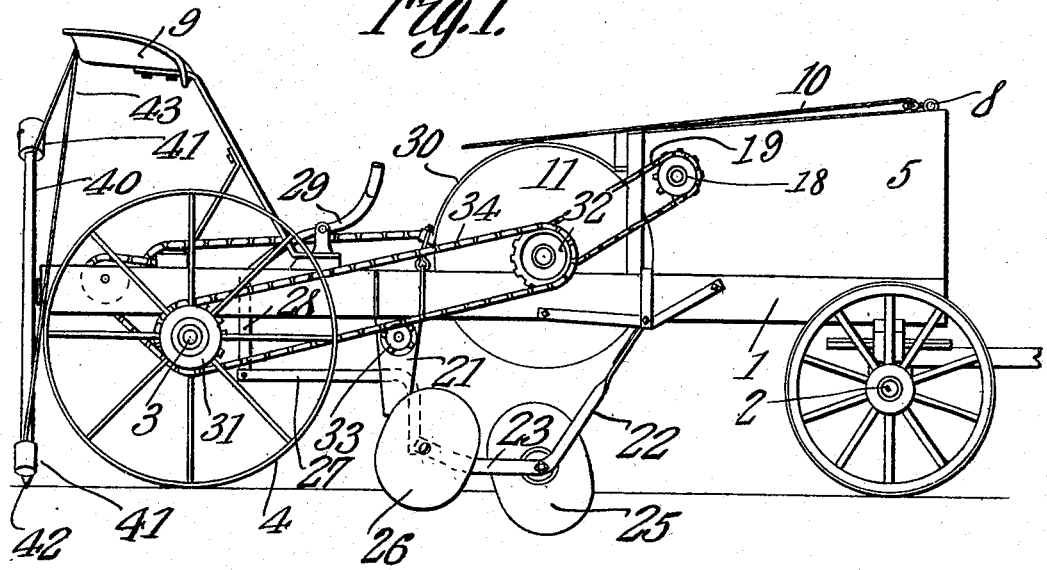
Figure 2:
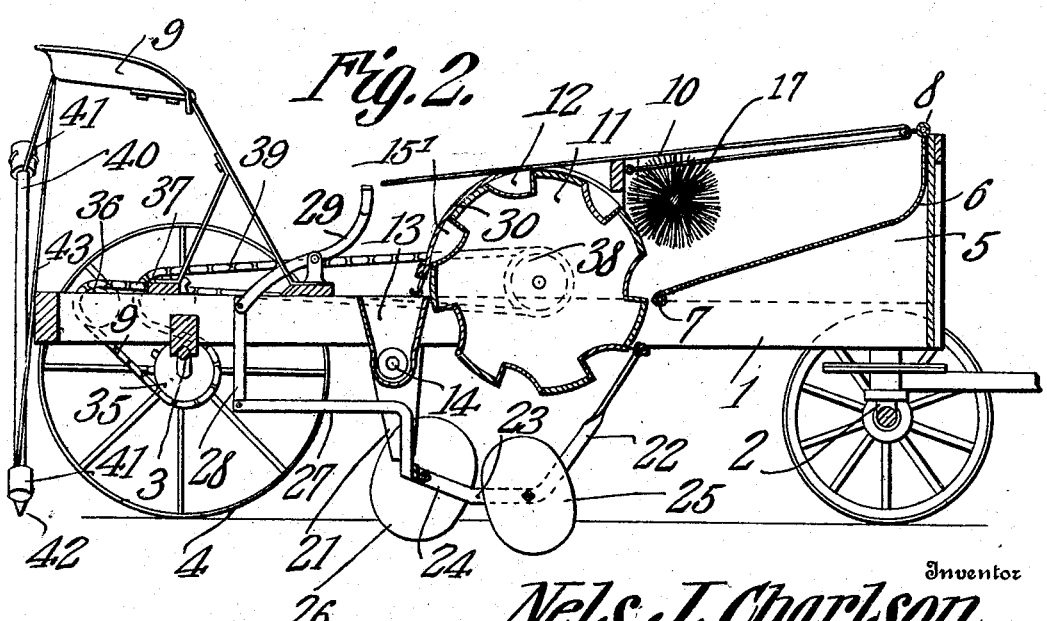

In the accompanying drawings:—Figure 1 is a side elevation of the potato planter. Fig. 2 is a longitudinal sectional view of the same. Fig. 3 is a top plan view of the same. Fig. 4 is a detail view of the marker with part in section.

The potato planter comprises a frame 1 which is mounted at its forward end upon a truck 2 and at its rear end upon an axle 3, to which is journaled traction wheels 4.

A hopper 5 is mounted upon the forward portion of the frame 1, and a canvas or other flexible strip of material 6 forms the bottom thereof, the said canvas being attached at one end to a cross-rod 7 located at the rear portion of the said hopper, and is provided at its other end with a cross-rod 8, which is adapted to engage the upper edges of the sides of the said hopper.

An operator's seat 9 is mounted upon the frame 1, and a cable 10 is connected with the rod 8, and, at its rear portion, extends back in the vicinity of the seat 9, from whence the said cable may be drawn, whereby the rod 8 and the attached end of the hopper-bottom 6 may be drawn toward the rear portion of the machine.

A drum 11 is journaled for rotation upon the frame 1 and is located at the rear of the hopper 5 and forms a portion of the rear side thereof. The drum 11 is provided upon its periphery with a series of pockets 12. A trough 13 is attached to the frame 1 behind the drum 11 and is provided in its bottom with a journaled auger or screw feed 14.

As illustrated in Fig. 3 of the drawings the end portions 15 of the auger are twisted or disposed in opposite directions, whereby the said auger will cause the potatoes deposited therein to move toward the opposite ends of the trough 13. Each of the pockets 12 is divided by a partition 15' into end portions, and trough 13 is provided with a partition 16 which is located at a point equidistant from the ends of the said trough. A brush 17 is journaled in the hopper 5 and is provided upon its shaft with a sprocket wheel 18. A chain 19 passes around the sprocket wheel 18 and an adjacent sprocket wheel to be described hereinafter.

At the ends of the trough 13 are located depending chutes 21. Beams 22 are pivotally attached to the side portions of the frame 1 and are downwardly disposed toward their intermediate portions 23 and upwardly disposed at their rear portions 24. Furrow-opening disks 25 are journaled for rotation at intermediate portions 23 of the beams 22, and furrow-closing disks 26 are journaled for rotation at the rear extremities of the said beams. The lower ends of the chutes 21 terminate adjacent the sides of the disks 26. The rear ends of the beams 22 connect with a bar 27, which, in turn, is connected by means of a link 28 with a lever 29 fulcrumed upon the frame 1. Thus it will be seen that by swinging the lever 29 the link 28 is caused to move longitudinally, and the bar 27 and beam 22 may be raised or lowered, as desired. A shield 30 is located over the upper portion of the drum 11.

A sprocket wheel 31 is arranged to rotate with one of the traction wheels 4, and a double sprocket wheel 32 is journaled upon the shaft of the drum 11 or other support provided upon the frame 1. A sprocket wheel 33 is fixed to the shaft of the auger 14, and a sprocket chain 34 passes around the wheel 31 and a portion of the wheel 32, and at one of its runs bears against the side of the wheel 33. Thus, means is provided for transmitting rotary movement from one of the traction wheels 4 to the auger 14. The chain 19 above referred to passes around the outer portion of the wheel 32.

A sprocket wheel 35 is mounted for rotation with one of the traction wheels 4, and sprocket wheels 36 and 37 are journaled upon the frame 1. A sprocket wheel 38 is fixed to the shaft of the drum 11, and a sprocket chain 39 passes around the sprocket wheels 35 and 38 and over the sprocket wheels 36 and 37, in the manner indicated in Fig. 2 of the drawings. Thus it will be seen that rotary movement is transmitted from one of the traction wheels 4 to the drum 11, but, by reason of the fact that the chain 39 passes over the idle sprocket wheels 36 and 37, the rotary movement from the traction wheel 4 to the drum is transmitted in the opposite direction from that in which the said traction wheel rotates when the implement is traveling in a forward direction.

From the above description it will be seen that as the implement is drawn along the surface of the ground, and the hopper 5 contains potatoes, the disk 25 will open a furrow in the ground, and that the drum 11 will rotate rearwardly at its upper portion. As the said drum rotates the pockets 12 receive potatoes from the flexible bottom 6 of the hopper 5, and the surplus potatoes are brushed back by the brush 17. The potatoes that lodge in the pockets 12 are carried up and over the drum and fall into the trough 13. By reason of the fact that the auger 15 located in the said trough is in a state of rotation, as above indicated, the potatoes deposited in the trough are carried toward the ends thereof and drop through the chute 21 into the furrows opened by the disk 25. The potatoes thus deposited in the furrows are covered by the following disks 26, and the traction wheels 4 compress the soil back upon the potatoes by the covering disks 26, and thus the planting is effected.

A marker of peculiar construction is connected with the planter. The marker consists of a pipe 40, which is pivoted at a point equidistant from its ends to the rear end of the frame 1. Receptacles 41 are located at the ends of the pipe 40 and carry marking shoes 42. Cords 43 are attached at their outer ends to the outer portions of the pipe 40, and extend back to the operator's seat or to a point in the vicinity thereof. The pipe 40 and one of the receptacles 41 contain a quantity of water, and thus when one of the receptacles 41 is in a lower position the water will flow therein and hold the same down close to the ground, so that the marking shoe carried thereby will indicate a line upon the ground, as the implement moves in a forward direction. When the end of the planting row has been arrived at, and it is desired to mark the ground from the other side of the machine, the operator draws upon one of the cords 43, whereby that receptacle containing the body of water is elevated, and the water will flow through the pipe 40 into the other receptacle, which is held in a lowered position under the weight of the water and the shoe carried by the last receptacle will continue the soil-marking operation, as indicated.

What is claimed is:—

1. A potato planter comprising a wheel-mounted frame, a hopper located thereon, a strip of flexible material forming the bottom of the hopper, a drum journaled for rotation behind the hopper and forming a portion of the rear side thereof, said drum having pockets in its periphery, a trough adapted to receive the potatoes from the drum and having at its ends depending chutes, an auger located in the trough, furrow-openers located in advance of the delivery ends of the chutes, furrow-closers located behind the delivery ends of the chutes, and means for rotating the auger, and means for rotating the drum.

2. A potato planter comprising a wheel-mounted frame, a hopper mounted upon the frame, a drum journaled for rotation behind the hopper, and forming a portion of one side thereof, said drum having pockets in its periphery, a trough located behind the drum, an auger journaled for rotation in the trough, a delivery chute depending from the trough, a furrow-opener located in advance of the delivery end of the said chute, and a furrow-closer located behind the delivery end of the said chute.

3. A planter comprising a wheel-mounted frame, a hopper located thereon, a drum journaled for rotation behind the hopper and having pockets in its periphery, a trough located behind the drum, an auger journaled for rotation in the trough, means for rotating the auger and the drum, beams pivoted to the frame of the planter, furrow openers journaled to the beams in relatively low positions, furrow-closers carried by the beams and located in positions elevated with relation to the furrow-openers, and delivery chutes leading from the trough to points between the furrow-openers and furrow-closers.

4. A planter comprising a wheel-mounted frame, a hopper mounted thereon and having a flexible bottom, a drum journaled for rotation behind the hopper and forming a portion of one side thereof, the drum having pockets in its periphery, a brush located in the hopper and held in contact with the periphery of the drum, a trough located behind the drum, an auger journaled for rotation in the trough, chutes depending from the ends of said trough, means for rotating the auger, means for rotating the drum, beams pivotally attached to the frame of the planter, furrow openers journaled to the beams at relatively low points, furrow-closers journaled to the beams at points elevated with relation to the said furrow-openers, the delivery ends of the chutes being located between the furrow-openers and furrow-closers.

In testimony that I claim the foregoing as my own, I have hereto affixed my signature in the presence of two witnesses.

NELS JOSEPH CHARLSON.

Witnesses:
CHRIS. GRANE,
S. CHARLSON.